(12) United States Patent
Canales (10) Patent No.: US 6,938,480 B2
(45) Date of Patent: Sep. 6, 2005

(54) ENCAPSULATED FLOAT AND METHOD FOR MAKING SAME

(76) Inventor: Ricardo Canales, 7010 W. Broadway, Glendale, CA (US) 91204

( * ) Notice: Subject to any disclaimer, the term of this patent is extended or adjusted under 35 U.S.C. 154(b) by 73 days.

(21) Appl. No.: 10/282,401

(22) Filed: Oct. 29, 2002

(65) Prior Publication Data

US 2004/0079151 A1 Apr. 29, 2004

(51) Int. Cl.$^7$ ............... G01F 23/76; G01F 23/52; G01F 23/36; G01F 23/60
(52) U.S. Cl. .................................. 73/313; 73/322.5
(58) Field of Search ................... 73/313, 322.5, 73/311, 317, 305, 306; 340/623, 625

(56) References Cited

U.S. PATENT DOCUMENTS 4,480,054 A * 10/1984 Enderle ..................... 521/84.1
6,041,650 A * 3/2000 Swindler et al. ............. 73/317

FOREIGN PATENT DOCUMENTS

| JP | 50065570 A | * | 6/1975 | ........... B29D/00/00 |
| JP | 59138421 A | * | 8/1984 | ........... B29D/27/00 |
| JP | 62255823 A | * | 11/1987 | ........... G01F/23/76 |

* cited by examiner

Primary Examiner—Hezron Williams
Assistant Examiner—Tamiko Bellamy
(74) Attorney, Agent, or Firm—John E. Wagner; Sam Bernardo (57) ABSTRACT

A float, including rubber material for sensing liquid levels having a chemically resistant protective covering said float having greater resistance to attach from chemicals, such as hydrocarbons, acids, and chlorinated solvents, said float may be made to include magnets, guiding devices or sensors. Also disclosed is the method for manufacturing the float of this invention including the steps of milling acrylonitrile rubber, phenolic resin, sulfur and various additives in a Banbury mill and mixing at an elevated temperature below 250°, compression molding at up to 900 psi pressure between 250° and 350° F., cooling and filling pre made protective skin container with the mixture, closing the container and heating the sealed container to bond the mixture to the container skin.

28 Claims, 6 Drawing Sheets

STEP ONE
STAGE ONE - BANBURY MIX

While maintaining the temperature to below 250°, to a Banbury Mill add:

acrylonitrile rubber: next add zinc oxide: next add stearic acid salicylic acid
o-hydroxybenzoic acid
$C_6H_4(OH)(COOH)$
w/paraffnic oil
for stability: next add mistron vapor
$Mg_3Si_4O_{10}(OH)_2$: next add Coumarone Indene Resin absorbed on synthetic calcium silicate (72% Cumar P-25): next add sulfur blend for between 60 to 180 minutes or until pale yellow-brown in color

FIG. 5

STEP ONE

STAGE TWO

ENCAPSULATED FLOAT AND METHOD FOR MAKING SAME

REFERENCE TO RELATED APPLICATIONS

This application claims benefit of U.S. Provisional Patent Application Ser. No. 60/201,022 filed May 1, 2000, and International Application No. PCT/US01/13645 filed Apr. 28, 2001, and hereby claims the benefit of the embodiments therein and of the filing dates thereof.

FIELD OF THE INVENTION

This invention is in the field of rubber-based floats for measuring liquid levels.

BACKGROUND OF THE INVENTION

Virtually every industry utilizes floats for liquid-level sensing in various applications, such as fuel tanks and liquid reservoirs, where the accurate and reliable measurement of the liquid level is important. Many floats are designed to include magnets, inserts, or guiding devices, all of which aid the float in performing its function. Generally, these guiding devices, inserts or magnets are molded within the float and actually become a part of a float assembly.

Floats made of rubber materials, such as acrylonitrile rubber, are very popular because they are comparatively inexpensive, easy to manufacture into a variety of shapes and sizes and can be designed to meet a wide range of densities. Additionally, rubber-based floats are readily capable of being molded to include magnets, guiding devices, inserts, and the like, all of which aid the float in performing its function.

In spite of the aforementioned benefits of rubber-based floats, there is one significant disadvantage to their use. Rubber-based floats have a tendency to fail or degrade in the presence of various chemicals, such as acids, certain hydrocarbons, chlorinated solvents, and alcohols. Failure or degradation of rubber-based floats in these environments is the result of either or both actual chemical attack of the rubber material or absorption of the chemical by the rubber-based float. Absorption can cause the float to fail by reason of an increase in weight or by fragmentation and/or cracking of the float.

Today, many Federal, State and Municipal governments have offered financial incentives to individuals, businesses, and governmental agencies that utilize a fuel which is less polluting. One type of fuel which has gained popularity is an alcohol-gasoline blend. It has been found that use of such blends may lower a vehicle's emissions. With this key benefit in mind, many fuel manufacturers have spent considerable sums of money in developing and improving the alcohol-gasoline blends and have added alcohol-blended fuels to their product line.

As mentioned earlier, rubber-based floats are subject to partial or complete failure when utilized in conjunction with alcohols or products that are blended with alcohols. In cases where a non-alcohol compatible rubber-based float is used in conjunction with an alcohol or alcohol-blended product, the rubber material either absorbs or is attacked by the alcohol. Ultimately such absorption or attack will lead to the failure of the rubber-based float. Consequently, rubber-based floats have limited utility in these type chemical environments.

Exposure to other chemicals, such as chlorinated solvents, acids, and certain hydrocarbons, may also lead to the failure of a rubber-based float. Failure under these circumstances also occurs by attack or degradation of the float by the chemicals or by absorption by the rubber material of the chemical. Again, the inadvertent introduction of an incompatible float into a fuel tank or reservoir containing chlorinated solvents, certain hydrocarbons, or acids could lead to the failure of the rubber-based float, which in turn could result in serious, catastrophic, or possibly tragic consequences.

To date, the only means known to overcome the chemical incompatibility problems of rubber-based floats was to simply avoid their use in certain chemical environments.

As a result of the aforementioned problems in using rubber-based floats, it is the object of this invention to develop rubber-based floats which:

can be easily molded into various sizes and shapes;

can be molded to accept internal magnets, sensors, guiding devices, inserts, and the like;

are relatively easy and inexpensive to manufacture;

have use within a wide range of applications;

are resistant to attack or absorption from most chemicals, including most chlorinated solvents, hydrocarbons, alcohols, and acids;

are safe from catastrophic failure; and effectively prevents float deterioration.

BRIEF DESCRIPTION OF THE INVENTION

In light of the state of the art, the inventor has set out to produce a rubber float, particularly of closed cell foam acrylonitrile rubber which is resistant to attack from, or absorption of, most chemicals, such as chlorinated solvents, acids, alcohols, and certain hydrocarbons. Such a float must be relatively inexpensive to manufacture, able to be molded into various sizes and shapes, and capable of being molded to include magnets, inserts, guiding devices, and the like. The float must also have an application within a wide range of temperatures and pressures.

These objects, and others, which will become apparent upon consideration of the following disclosure, are achieved by this invention, which briefly stated comprises the encapsulation of acrylonitrile rubber-based float material within a container, such as polyethylene or some other thermoplastic, wherein the two are bonded together to create a closed-cell acrylonitrile rubber float, which is completely encapsulated within a precisely dimensional protective plastic skin. A float of this invention is virtually impervious to attack from or the absorption of most chemicals, while at the same time maintaining its low cost, broad application, and flexibility of design. The inventive float is also capable of being molded to include magnets, inserts, guiding devices, and the like.

BRIEF DESCRIPTION OF THE DRAWINGS

This invention may be more clearly understood with the following detailed description and by reference to the drawings in which:

FIG. 1, including FIGS. 1a and 1b, are transverse sectional views of two common prior art rubber floats;

FIG. 2, including FIGS. 2a and 2b, are transverse sectional views of two floats similar to those of FIG. 1 modified in accordance with this invention;

FIG. 3 is an enlarged fragmentary sectional view of the bond region between the acrylonitrile rubber core material and the thermoplastic protective skin;

FIG. 4, including FIGS. 4a and 4b, 4a is a perspective view of a cylindrical float just prior to the encapsulation step, and FIG. 4b is a cross section of the float of FIG. 4a;

DETAILED DESCRIPTION OF THE INVENTION

Acrylonitrile rubber floats have been used for years for liquid level sensing; however, their use has been limited to those situations where the environment in which the float was utilized did not also include chemicals, which would either attack or be absorbed by the acrylonitrile rubber. Such attack or absorption could eventually result in the partial or complete failure of the float, and possibly culminate in human tragedy.

The present invention is concerned with rubber-based floats, particularly an acrylonitrile rubber float, which is encapsulated in a protective skin, and method for making same. The skin protects the float from attack by various chemicals, which are aggressive towards and degrade acrylonitrile rubber, e.g., chlorinated solvents, acids, and certain hydrocarbons. In still other cases, the skin acts to eliminate absorption by the acrylonitrile rubber of various chemicals, such as alcohols, chlorinated solvents, acids, and certain hydrocarbons.

The encapsulated acrylonitrile rubber float of this invention is manufactured in basically a two-step process. The first step is the manufacture of the acrylonitrile rubber float material or preform, with the second step being the encapsulation of the acrylonitrile rubber float material within a protective skin. Encapsulation does not alter the float's functionality or performance; however, it does allow the float to resist attack by or absorption of most other chemicals.

The Product

Figures 1, 1A, 1B:
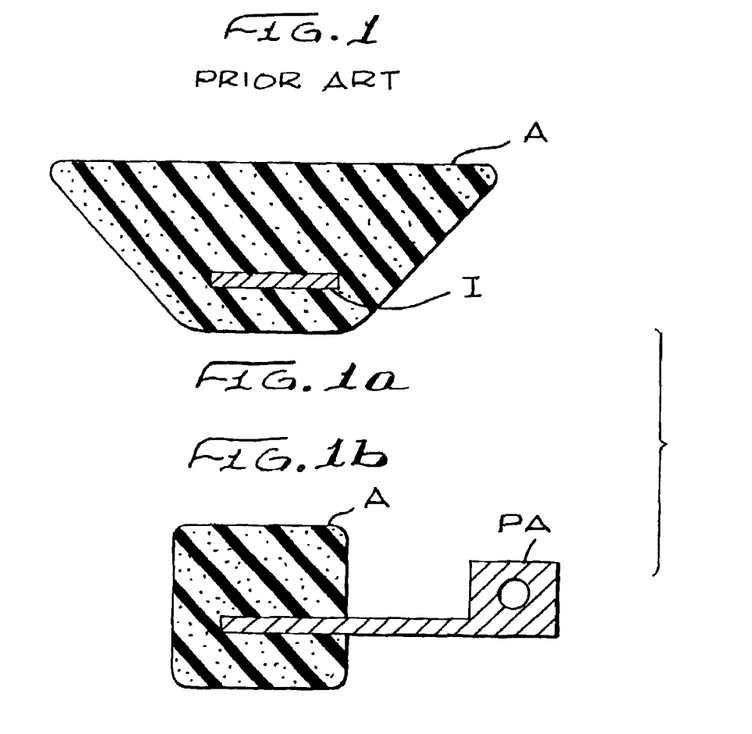

FIG. 1 is comprised of FIGS. 1*a* and 1*b*, both of which depict two types of commercially available prior art acrylonitrile rubber floats, neither of which is encapsulated. The floats of FIG. 1 are both comprised of acrylonitrile rubber material A. FIG. 1*a* reveals an insert 1, and FIG. 1*b* reveals a carburetor pivot arm PA, both of which are imbedded within and held in place by the acrylonitrile rubber material.

The above-mentioned inserts aid the float in performing its function. Floats, such as these, are subject to attack by or absorption of various chemicals, as shown later in Tables 1–8, resulting in change in weight, volume or durability of the float.

Figures 2, 2A, 2B:
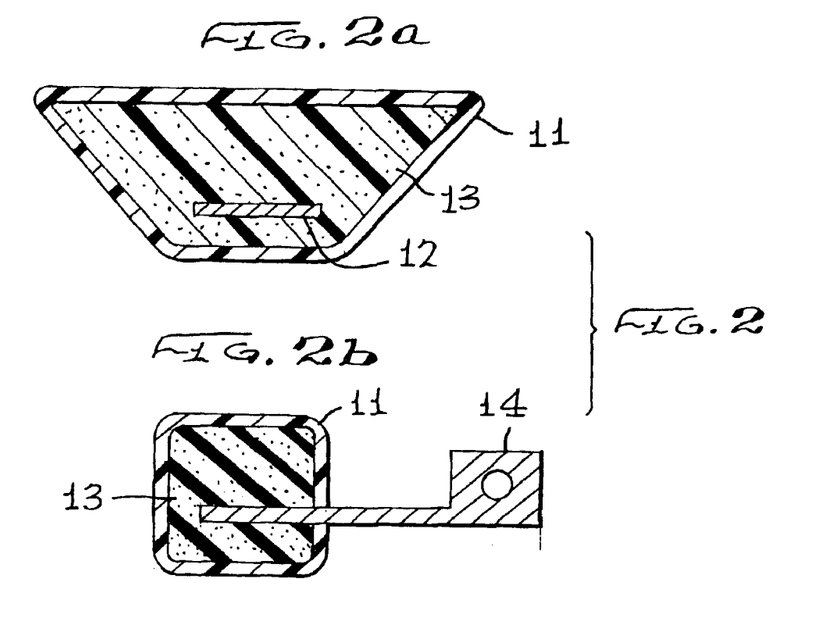

FIG. 2, comprised of FIGS. 2*a* and 2*b*, illustrates an encapsulated version of the same type floats of FIG. 1. FIG. 2 depicts the protective skin 11, which encapsulates and protects the entire float. The protective skin does not alter the float's appearance or volume nor does it alter the float's functionality. This protective skin does eliminate all of the problems associated with the embodiment of FIGS. 1*a* and 1*b* as disclosed above.

FIG. 2*b* reveals an insert 12 within acrylonitrile rubber material 13, while FIG. 2*a* shows an encapsulated float with a carburetor pivot arm insert 14 within the acrylonitrile rubber material.

A comparison of the floats of FIG. 1 with those of FIG. 2 reveals that the encapsulated floats are virtually identical to the non-encapsulated floats in both size, shape and weight, except that the encapsulated floats are more resistant to chemical attack or absorption, then a non-encapsulated float. A comparison of the performance of the non-encapsulated float and encapsulated floats is set forth in detail in Tables 1–8 below.

Figures 3, 4A, 4B:
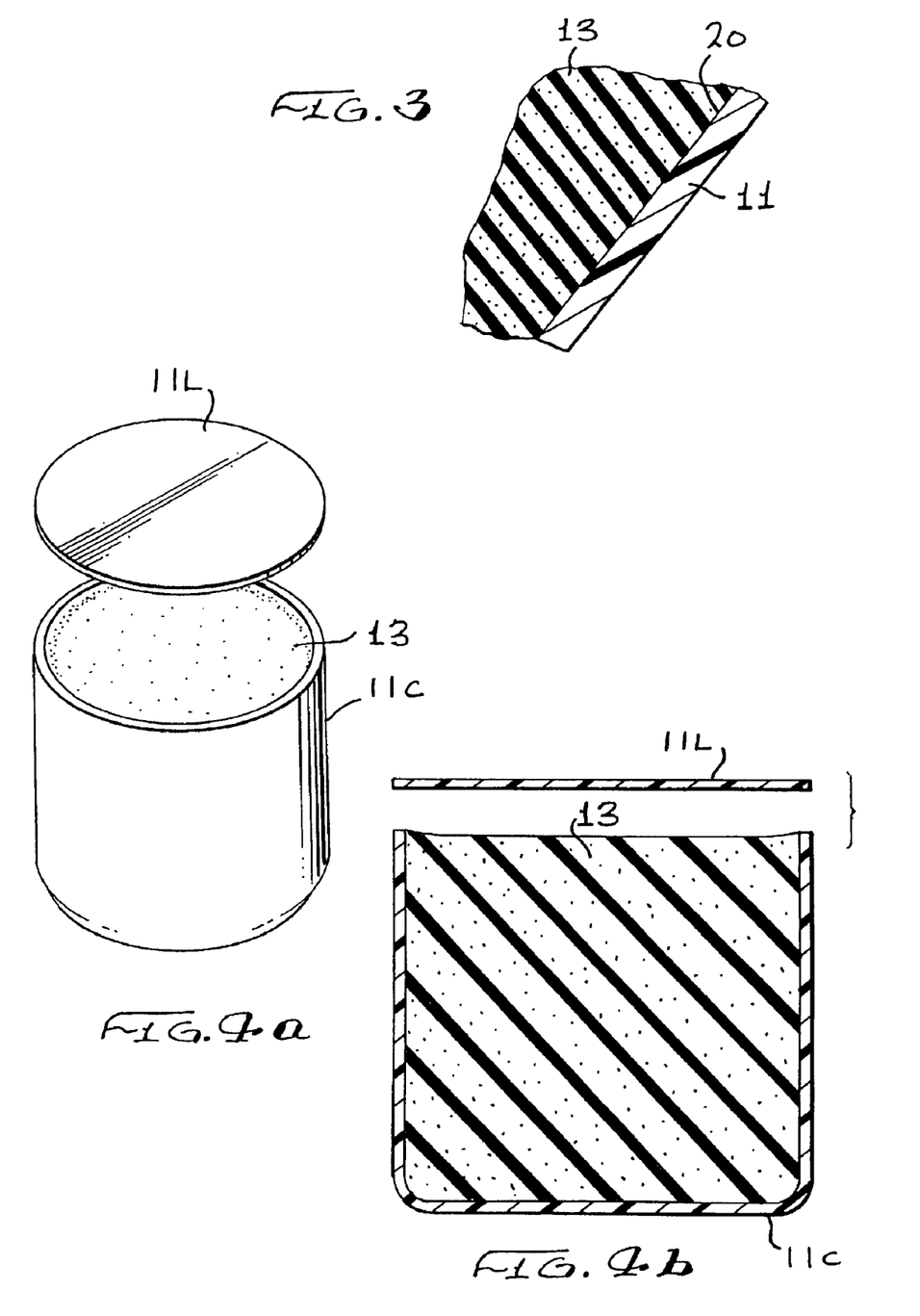

Turning now to FIG. 3, which illustrates a closed cell acrylonitrile rubber core material 13 in bonding engagement 20 with the protective plastic skin 11. Thermoplastics, such as high and low-density polyethylene or high and low-density polypropylene may be used to encapsulate the acrylonitrile rubber float material 13.

As can be seen in FIG. 3, the acrylonitrile rubber core material 13 and the thermoplastic 11 form a strong bond at their interface 20. The bond is sufficiently strong to withstand attempts to separate the core material from the skin, and may be mechanical, thermal or chemical.

Attempts to separate the thermoplastic skin 11 from the acrylonitrile rubber core material 13 by hand have been unsuccessful. The encapsulated float of this invention will actually tear before the bond 20 between the thermoplastic skin 11 and acrylonitrile rubber core 13 will break. The bond 20 between the acrylonitrile rubber core material 13 and the thermoplastic skin 11 results in a unitary float body.

The skin 11 is approximately 0.02 to 0.06 of an inch thick; however, wall thickness can be designed to meet the demands of the environment. The skin also produces a precise weight change factor, which is designed into the float.

FIG. 4*a* illustrates a cylindrical float just before the encapsulation step, wherein the acrylonitrile rubber core material 13 is placed into the preformed skin 11*c* with lid 11L. FIG. 4*b* illustrates a cross section of FIG. 4*a* just prior to the bonding of the acrylonitrile rubber core material 13 to the protective skin 11 (11*c* and 11L).

The significance of the inventive float is that the acrylonitrile rubber core material 13 enters into complete bonding engagement at the interface 20 of the thermoplastic skin 11, providing uniform protection of the core material 13 from the outside chemical environment.

The Process

Turning now to step one, as shown in FIGS. 5, 6, 7, and 8 of the manufacture of the acrylonitrile rubber-based float material. Step one is comprised of three separate stages:

Stage 1, the Banbury mix

Stage 2, the roller mix

Figure 7:
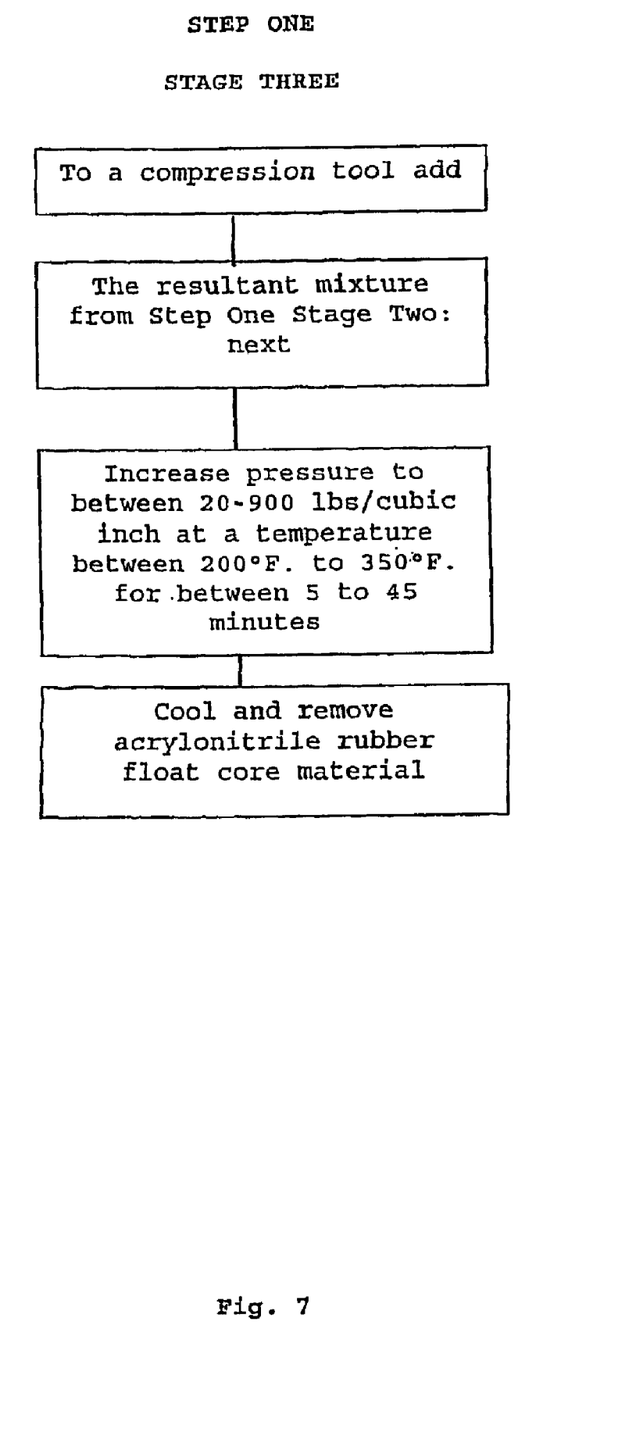
FIG. 7 is a flow diagram of step 1, stage 3 of the process of this invention.

Stage 3, the compression stage.

Figure 5:
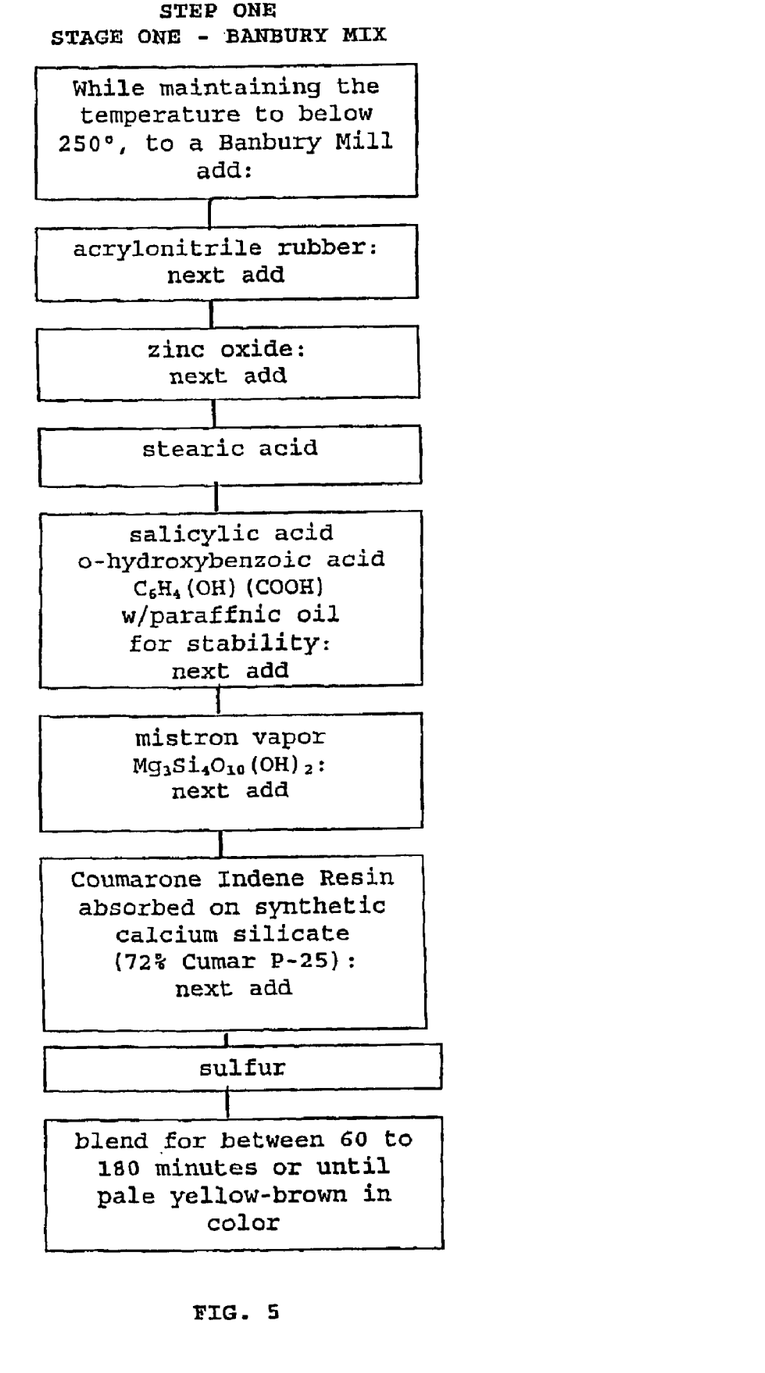
FIG. 5 is a flow diagram for step 1, stage 1 of the process of this invention.

In both the Banbury stage, FIG. 5, and the roller mill stage, FIG. 6, below, the inventor has set forth a wide range of the additives to be mixed. This represents the broad range of acrylonitrile rubber formulations presently utilized within the industry. The exact formulation will vary with the consumer needs and specifications.

The preferred embodiment, which is the most common of these formulations, is set forth in parenthesis beside each ingredient additive range.

I

The first stage, or Banbury mix, FIG. 5, occurs as follows: Blending in a Banbury Mill or the like, by weight, add between 30.0% to 55.0% (37.04% to 37.50%) acrylonitrile rubber, 0.5% to 4.2% (0.84% to 1.01%) zinc oxide, 1.0% to 15.0% (1.67% to 2.02%) stearic acid, 0.1% to 2.0% (0.21 to 0.51%) retarder SAX salicylic acid (0-hydroxybenzoic acid) $C_6H_4$ (OH)(COOH), 3.0% to 22.0% (14.14% to 15.83%) mistron vapor $Mg_3Si4O10$ $(OH)_2$, 0.3% to 2.75% (0.83% to 1.35%) Coumarone Indene Resin absorbed on Synthetic Calcium Silicate (72% Cumar P-25), and 8.0% to 15.0%

(10.10% to 10.83%) sulfur, while maintaining the temperature of the mixture to below 250° F.

The inventor has determined that, for best results, the addition of the compounds in the Banbury stage should occur in the sequence set forth above.

Blending is completed after a period of 60 to 180 minutes or when the mixture turns a pale yellow-brown in color.

Upon completion of the Banbury mixture stage, confirm that the Shore A hardness of the mixture is between 15–90. For the preferred embodiment, the Shore A hardness is between 65 and 75.

II

Figure 6:
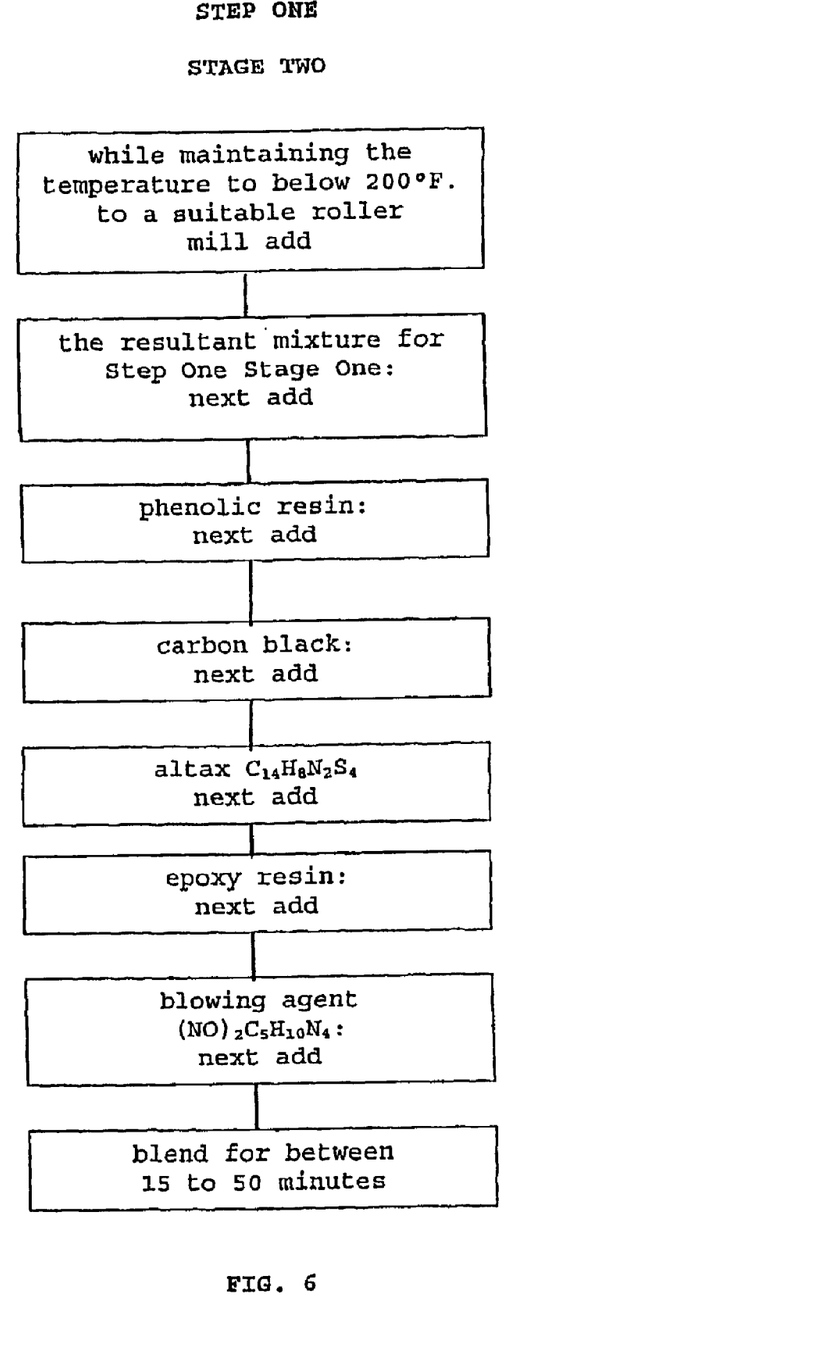
FIG. 6 is a flow diagram for step 1, stage 2 of the process of this invention.

Transfer the completed stage one mixture to a suitably sized roller mill to begin stage 2, as shown in FIG. 6. To the stage one mixture, add by weight, between 12.0% to 40.0% (22.22% to 22.50%) phenolic resin $(C_6H_6O \cdot CH_2O)X$, 2.5% to 10.0% (3.33% to 4.03%) carbon black, 0.25% to 1.5% (0.63% to 0.84%) Altax $C_{14}H_8N_2S_4$, 1.75% to 15% (2.50% to 2.70%) epoxy-resin, and finally 1.0% to 5.0% (3.33% to 4.04%) blowing agent $(NO)_2C_5H_{10}N_4$, while controlling the temperature of the mixture throughout this stage to less than 200° F. The inventor has determined that for best results, the addition of compounds in roller mix stage should also occur in the sequence listed above.

Mixing is completed in approximately 15 to 50 minutes or when the mixture is uniform and turns to a black, smooth sheet.

A Shore A hardness test is conducted to confirm hardness of between 15 and 90. For the preferred embodiment, the Shore A hardness is between 65 and 75.

III

The compression stage of FIG. 6 is the third and final stage of step 1. The pre-cured acrylonitrile rubber-based mixture of completed step 2 is placed into a conventional compression tool where, depending upon the formation, the pressure is increased to between 20–900 lbs/cubic inch for between 5 to 45 minutes at a temperature of between 200° F. to 350° F., FIG. 7. In the preferred embodiment, the pressure in this stage is between 350 and 410 lbs/cubic inch for 10 to 18 minutes at a temperature of between 265° F. and 275° F.

The acrylonitrile rubber foam is removed from the compression tool and allowed to cool. Cooling may be achieved in air or by any convention manner.

After the acrylonitrile rubber foam has cooled, it is inspected for visual defects in preparation for the encapsulation step. The foam material is tested again to confirm that its Shore A hardness is between 15–90. For the preferred embodiment, the Shore A hardness is between 65 and 75.

The acrylonitrile rubber foam material is weighed and trimmed of any excess material, if necessary, to meet the desired unit shape and weight. Stage Three and Step One are now complete.

IV

Figure 8:
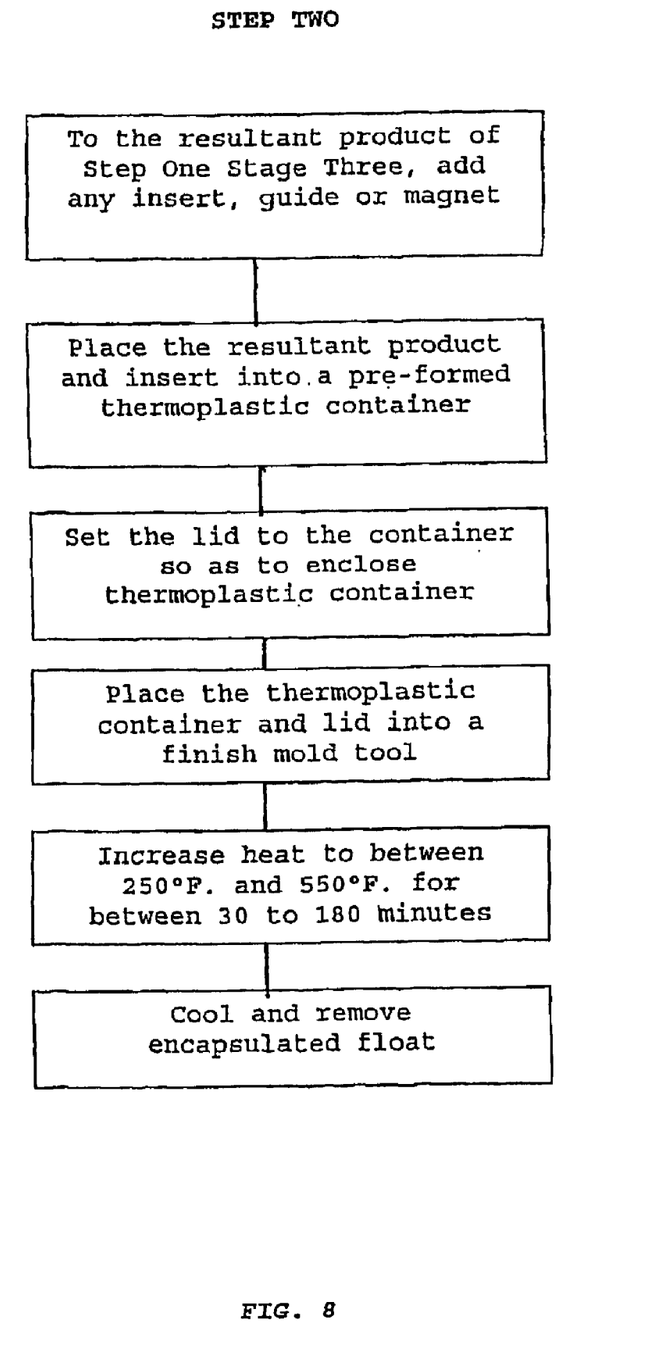
FIG. 8 is a flow diagram of step 2 the encapsulation.

The acrylonitrile rubber foam is now ready for the encapsulation step FIG. 8. However, prior to the encapsulation step, any magnets, inserts, guides, or the like are placed into the acrylonitrile rubber foam by conventional means, such as drilling an opening and inserting the inset in place.

Thermoplastic containers, which have been pre-molded to meet the desired size and shape specifications, are visually inspected for defects. The inventor has determined that both high and low-density polyethylene, and high and low-density polypropylene, bond equally as well with the acrylonitrile rubber core material. The pre-molded thermoplastic is in a container shape and is preferably formed to have only one open end or lid and thus only one seam, although multi-seam containers may be used.

The inventor has determined that the physical characteristics of the encapsulation material, e.g., wall thickness, is more easily controlled when it is premolded. By contrast, dipping, painting or spraying the acrylonitrile rubber foam material with the encapsulation material would likely result in a non-uniform skin, and thus an improper float.

The desired weight of pre-cured acrylonitrile rubber foam unit, taking into account the container and lid weight, is placed into the thermoplastic container, to fill the space. The container lid is loosely placed onto the container, to close the container and meet final products dimensional requirements. Thereafter, the plastic container, with acrylonitrile rubber core material and/or insert, are placed into a finish mold tool. The finish mold tool is designed to conform to the size and shape of the thermoplastic container. The inventor has, for purposes of this application, elected to describe the encapsulation process wherein high-density polyethylene is utilized as the encapsulation material.

Thereafter, the finish mold tool is, depending on formulation, heated by any conventional means to between 250° F. to 550° F. for between 20 to 180 minutes to allow the acrylonitrile rubber material to expand into intimate contact with the entire interior surface of the thermoplastic container and enter into bonding engagement thereto. During this step, the container and lid are also bonded to seal the float.

For the preferred embodiment, the finish mold tool is heated to between 250° F. to 500° F. for between 30 to 70 minutes. The temperature and time may vary where high-density polyethylene, or high and low-density polypropylene, are used as the encapsulation material. After the allotted time period, the finished mold tool is allowed to cool by any conventional means until it is ambient temperature. Upon completion of this step, the acrylonitrile rubber foam material with insert, if any, is bonded to and encapsulated within the protective polyethylene skin, FIGS. 2 and 3. The resultant float is now a unitary body.

Table 1 is a summary of results of a Shore A hardness test comparing the acrylonitrile rubber encapsulated float of the invention (denoted U-2000) with two non-encapsulated, but commercially available acrylonitrile rubber floats denoted "A" and "B" after a methanol soak. The three floats were submerged in a 100% methanol bath and allowed to soak for 28 days at a temperature of between about 64° to 78° F.

After removal from the methanol soak each day, the floats were each given identical shore hardness tests and then returned to the bath.

As shown in Table 1, the acrylonitrile rubber float of this invention did not lose any of its Shore A hardness, while the two competitive but non-encapsulated acrylonitrile rubber floats lost 17.5 points of hardness (A float) and 11.5 points of hardness (B float), respectively.

The conclusion drawn from this test is that the encapsulated float of this invention did not absorb any methanol and thus lose hardness, as compared with non-encapsulated floats.

TABLE 1

Methanol Soak - Shore A Hardness
Test Parameter - Temperature 64–78 Deg. F.,
Commercial Grade Methanol (CAS 67-56-1)

|  | A | B | U-2000 |
|---|---|---|---|
| Start | 94.5 | 95.5 | 93 |
| Day 1 | 92 | 94.5 | 93 |
| Day 2 | 89 | 93 | 93 |
| Day 3 | 87 | 93 | 93 |
| Day 4 | 87 | 92 | 93 |
| Day 8 | 86 | 92 | 93 |
| Day 9 | 86 | 90 | 93 |
| Day 10 | 85 | 90 | 93 |
| Day 14 | 82 | 87 | 93 |
| Day 17 | 80 | 87 | 93 |
| Day 22 | 78 | 85 | 93 |
| Day 28 | 77 | 84 | 93 |

Turning now to Table 2, which presents the results of a methanol immersion test comparing the same three types of floats, as utilized in Table 1. Here, the three floats were again immersed into a 100% methanol bath for 28 days. This test measured the amount of methanol absorbed by each float as an increase in each float's weight. Each day the floats were removed from the methanol bath, weighed and returned to the methanol bath.

The encapsulated acrylonitrile rubber float of this invention exhibited only 0.01 grams weight gain after 28 days, while the two non-encapsulated, acrylonitrile rubber floats exhibited a significantly higher increase in weight. Acrylonitrile rubber float A increased 8.20 grams in weight after 28 days, while the B acrylonitrile rubber float increased 9.62 grams in weight after 28 days.

The conclusion drawn from this test is that the encapsulated float of this invention did not absorb significant amounts of methanol over the test period, whereas non-encapsulated floats did absorb a substantial amount of methanol.

Applicant wishes to point out that in regards to Tables 2–7, applicant was required to remove excess liquid from the floats by hand blotting prior to weighing. Hand blotting was used for measurement purposes during testing and did not result in completely dry samples.

TABLE 2

Methanol Immersion Weight Change (gms) Testing
Temperature 64–78 Deg. F.
Commercial Grade Methanol (CAS 67-56-1)

|  | A | B | U-2000 |
|---|---|---|---|
| Start | 48.48 | 53.96 | 8.02 |
| Day 1 | 49.03 | 54.33 | 8.03 |
| Day 2 | 49.55 | 54.83 | 8.02 |
| Day 3 | 49.88 | 55.43 | 8.02 |
| Day 4 | 50.20 | 55.96 | 8.08 |
| Day 8 | 51.02 | 57.58 | 8.08 |
| Day 9 | 51.60 | 57.85 | 8.09 |
| Day 10 | 51.86 | 58.10 | 8.05 |
| Day 11 | 51.93 | 58.36 | 8.04 |
| Day 14 | 52.81 | 59.28 | 8.03 |
| Day 17 | 53.73 | 60.08 | 8.06 |
| Day 22 | 55.09 | 61.41 | 8.04 |
| Day 28 | 56.28 | 62.58 | 8.03 |

Referring now to Table 3, which sets forth the results of the 1,1,1 Trichloroethane immersion test. The same three types of floats, as described in Table 1, were immersed in 100% 1,1,1 trichloroethane at a temperature of between 150° F. to 170° F. The test measured the amount of 1,1,1 trichloroethane absorbed by each float as an increase in each float's weight. Each day the floats were removed from the bath and weighted then returned to the bath.

The acrylonitrile rubber float of this invention (U-2000) increased only 0.02 grams in weight over a 24-hour period, while acrylonitrile rubber float A increased 30.83 grams in weight after only one hour, and acrylonitrile rubber float B increased 29.32 grams weight after only one hour. Both the A and the B floats were partially dissolved, severely swollen, and severely cracked after only one hour of immersion in the 1,1,1 trichloroethane. The conclusion from this test is that a non-encapsulated float would fail in a short period of time in this chlorinated solvent, whereas the inventive float would not.

TABLE 3

1,1,1,Trichloroethane Absorption
Immersion Test (gms) - Hot

|  | A | B | U-2000 |
|---|---|---|---|
| Start | 48.22 | 54.05 | 8.17 |
| Hour 1 | 79.05 | 83.37 | 8.21 |
| Hour 8 | * | * | 8.2 |
| Hour 24 | * | * | 8.19 |

* - Sample failure after 1 hour - sample partially dissolved, severely cracked, severely swollen.

Table 4 sets forth the results of an immersion test in an alcohol/gasoline blend, whereby two commercially available acrylonitrile rubber-based floats, A and C as well as the encapsulated acrylonitrile rubber float (U-2000) of this invention were immersed in a blend of 15% methanol and 85% regular unleaded commercially available gasoline by weight. The immersion test was conducted over 28 days at a temperature of between 68° to 77° F. The test measured the amount of absorption of the methanol/gasoline blend by each float as an increase in weight of each float. Each day the floats were removed from the bath, weighed and then returned to the bath.

The encapsulated acrylonitrile rubber float increased 0.01 grams in weight after 28 days, while acrylonitrile rubber float A increased 0.8 grams in weight, and acrylonitrile rubber float C increased 0.9 grams in weight.

The conclusion drawn from this test is that the encapsulated float of this invention did not absorb significant amounts of the methanol/gasoline mixture over the test period, whereas non-encapsulated floats did absorb a substantial amount of the methanol/gasoline mixture.

TABLE 4

15% Methanol/85% Unleaded Gasoline by Volume
Immersion Weight Change Test (gms)
Methanol - (CAS 67-56-1)
Gasoline (CAS 8006-61-9)
Ambient 68–77 Deg. F.

|  | A | C | U-2000 |
|---|---|---|---|
| Start | 48.0 | 48.2 | 8.11 |
| 7 Days | 48.6 | 48.8 | 8.13 |
| 12 Days | 48.7 | 48.8 | 8.14 |
| 21 Days | 48.8 | 48.9 | 8.1 |
| 28 Days | 48.8 | 49.1 | 8.12 |

Table 5 describes the results of an ethanol immersion test wherein the same three types of floats as described in Table 4 were submerged in 100% ethanol for 28 days. The temperature during the 28-day test was between 64° and 78° F. The test measured the amount of ethanol absorbed by each float as an increase in weight of each float. Each day the floats were removed from the bath, weighed and returned to the bath.

Both the A acrylonitrile rubber float and the C acrylonitrile rubber float increased 0.2 grams in weight, while the encapsulated acrylonitrile rubber float of this invention increased only 0.01 grams in weight.

The conclusion drawn from this test is that the encapsulated float of this invention did not absorb significant amounts of ethanol over the test period, whereas non-encapsulated floats did absorb a substantial amount of ethanol.

TABLE 5

100% Ethanol Immersion Testing Weight Change (gms)
Temperature 64–78 Deg. F.
CAS 64-17-5

|  | A | C | U-2000 |
|---|---|---|---|
| Start | 48.3 | 48.0 | 8.24 |
| Day 7 | 48.5 | 48.4 | 8.27 |
| Day 12 | 48.5 | 48.4 | 8.25 |
| Day 21 | 48.5 | 48.4 | 8.26 |
| Day 28 | 48.5 | 48.6 | 8.25 |

Turning to Table 6, which summarizes the results of a float immersion test in a 15% ethanol and 85% commercially available Regular Unleaded gasoline blend. The test measured the absorption of the ethanol gasoline blend by each float as an increase in the weight of each float over a 28-day period. This test was conducted at temperatures ranging from 64° to 78° F. The same three types of floats, as disclosed in Table 4, were utilized. Each day the floats were removed from the bath, weighed and returned to the bath.

The A non-encapsulated acrylonitrile rubber float increased 0.5 grams and the C non-encapsulated acrylonitrile rubber float increased 0.6 grams in 28 days, while the encapsulated acrylonitrile rubber float of this invention (U-2000) only increased 0.01 grams during the same time period.

The conclusion drawn from this test is that the encapsulated float of this invention did not absorb significant amounts of the ethanol/gasoline mixture over the test period, whereas non-encapsulated floats did absorb a substantial amount of the ethanol/gasoline mixture.

TABLE 6

15% Ethanol/85% Unleaded Gasoline by Volume
Immersion Weight Change Test (gms)
Methanol- (CAS 64-15-5)
Gasoline (CAS 8006-61-9)
Ambient 68–77 Deg. F.

|  | A | C | U-2000 |
|---|---|---|---|
| Start | 48.4 | 48.1 | 8.17 |
| 7 Days | 48.6 | 48.5 | 8.2 |
| 12 Days | 48.6 | 48.5 | 8.19 |
| 21 Days | 48.8 | 48.6 | 8.19 |
| 28 Days | 48.9 | 48.7 | 8.18 |

Referring now to Table 7, which sets forth the results of the diesel fuel immersion test. The same three types of floats, as described in Table 4, were immersed in commercially available diesel fuel. The test was conducted at temperatures of between 64° and 78° F. for 28 days and measured the amount of diesel fuel absorbed as an increase in weight of each float. Each day the floats were removed from the bath, weighed and returned to the bath. Both the A and C acrylonitrile rubber floats increased 0.7 grams in weight while the encapsulated acrylonitrile rubber float of this invention increased 0.07 grams in weight during the 28-day test.

The conclusion drawn from this test is that the encapsulated float of this invention did not absorb significant amounts of diesel fuel over the test period, whereas non-encapsulated floats did absorb a significant amount of diesel fuel.

TABLE 7

Diesel Fuel Immersion Weight Change (gms) Test
Diesel (Ref. CAS 544-76-3)
Ambient Temperature 64–78 Deg. F.

|  | A | C | U-2000 |
|---|---|---|---|
| Start | 47.5 | 48.3 | 8.11 |
| 7 Days | 48.2 | 49.0 | 8.21 |
| 12 Days | 48.2 | 49.0 | 8.18 |
| 21 Days | 48.2 | 49.0 | 8.22 |
| 28 Days | 48.2 | 49.0 | 8.19 |

Table 8 sets forth the affects of a nitric acid and ammonium bifluoride mixture on encapsulated and non-encapsulated acrylonitrile rubber floats. Four separate floats were introduced into a nitric acid mixture comprised of 250 ml of 70% commercial grade nitric acid and 27 grams ammonium bifluoride. Two of the floats were commercially available non-encapsulated acrylonitrile rubber floats, denoted A and C. The other remaining floats were the encapsulated acrylonitrile rubber float of this invention, and a commercially available hollow, stainless steel float. Each float was allowed to float upon the nitric acid mixture, thus directly exposing the bottom and portions of the side of each float to the acid mixture.

TABLE 8

Acid Test
Mixture of Nitric Acid (CAS 7697-37-2) and
Ammonium Bifluoride (CAS 1341-49-7)
Mixed 250 ml 70% Commercial Grade Nitric Acid
and 27 grams Ammonium Bifluoride Ambient Temperature,
Closed container, Sample Weights in Grams
Note - Test Materials Floated on Surface of Mixture,
Remaining Surfaces of Materials Exposed to Vapor

|  | A | C | U-2000 | Stainless Steel* |
|---|---|---|---|---|
| Start | 0.4 | 2.96 | 8.2 | 8.19 |
| 48 hours | 0.28 | 2.42 | 8.21 | 8.19 |
| 96 hours | 0.2 | 2.21 | 8.2 | 8.18 |
| 168 hours | ** | 1.18 | 8.22 | 8.19 |
| 336 hours | ** | ** | 8.22 | 8.17 |
| 504 hours | ** | ** | 8.22 | 8.16 |
| 672 hours | ** | ** | 8.21 | 8.16 |

* - Stainless Steel Float is Innovative Fusion P/N 1012-LW, 303 stainless steel with weld. Later stage of test showed etch effect.
** - Samples failed Parts were greatly dissolved and crumbling upon failure.

After 336 hours, both of the non-encapsulated acrylonitrile rubber floats, A and C, were destroyed. The stainless steel float weighted slightly less (0.03 grams) after 672 hours; however, there were visual signs of etching of the stainless steel. The encapsulated acrylonitrile rubber float (U-2000) exhibited no weight loss after 672 hours.

The conclusion from this test is that the encapsulated float and the stainless steel float are able to withstand immersion in a nitric acid bath, whereas the non-encapsulated floats are incapable of use in this type of environment.

The above-described embodiments of the present invention are merely descriptive of its principles and are not to be considered limiting. The scope of the invention instead shall be determined from the scope of any claims in a corresponding non-provisional application, including their equivalents.

List of Tables

Table 1 is a summary of results for Shore A hardness after a methanol soak;

Table 2 is a summary of absorption after a methanol immersion;

Table 3 is a summary of absorption after a 1,1,1 trichloroethane immersion;

Table 4 is a summary of absorption results after immersion in a 15% methanol, 85% regular unleaded gasoline mixture;

Table 5 is a summary of absorption results after an ethanol immersion;

Table 6 is a summary of absorption results after immersion in a 15% ethanol, 85% regular unleaded gasoline mixture;

Table 7 is a summary of absorption results after a diesel fuel immersion.

Table 8 is a summary of float degradation after a nitric acid/ammonium bifluoride mixture soak.

What is claim is:

1. A method of encapsulating a float for liquid level sensing with a protective skin comprising:

A first step, to a Banbury mill mixer or the like mix by weight about
30.0% to 55.0% acrylonitrile rubber
0.5% to 4.2% zinc oxide
1.0% to 15.0% stearic acid
0.1% to 2.0% retarder SAX salicylic acid (O-hydroxybenzoic acid) $C_6H_4(OH)$ (COOH)
3.0% to 22% mistron vapor $Mg_3Si_4O_{10}$ $(OH)_2$
0.3% to 2.75% coumarone Indene resin absorbed on synthetic calcium
Silicate (72% cumar P-25) and
8.0% to 15.0% sulfur
mix said components for between about 60 to 80 minutes while maintaining the temperature of the mixture to below about 250° F., a second step comprising taking the mixture of the first step transferring it to a suitably sized roller mill or the like and adding by weight about
12.0% to 40.0% phenolic resin $(C_6H_6O\cdot CH_{20})X$
2.5% to 10.0% carbon black
0.25% to 1.5% Altax $C_{14}H_8N_2S_4$
1.75% to 15% epoxy-resin and
1.0% to 5.0% blowing agent
mixing said components for about 15 to 50 minutes while maintaining the temperature of the mixture to below about 200° F.;

a third step comprising transferring the mixture of th second step to a compression tool where the mixture is subjected to a pressure of about 20–900 lbs. per cubic inch for between about 5 to 45 minutes at a temperature of between about 200° F. to 350° F., removing the mixture from th compression tool and cooling a fourth step, placing a sufficient amount of the material of the third step to fill a plastic container of the desired shape and size;

a fifth step of placing the plastic container into the desired finish mold tool and heating to between about 250° F. and 550° F. for between about 20 to 180 minutes to allow the acrylonitrile rubber to expand into intimate contact with the interior surface of the plastic container, whereby a rubber based float with a protective coating is produced.

2. A method as described in claim 1 wherein the mixture of the first step has a Shore A hardness of between about 15 to 90.

3. A method as described in claim 1 wherein the blowing agent is $(NO)_2C_3H_{10}N_4$.

4. A method as described in claim 1 wherein the mixture of the second step has a Shore A hardness of between about 15 to 90.

5. A method as described in claim 1 wherein the mixture of the third step has a Shore A hardness of between about 15 to 90.

6. A method as described in claim 1 wherein a magnet may be added at step 3.

7. A method as described in claim 1 wherein an insert may be added at step 3.

8. A method as described in claim 1 wherein guides may be added at step 3.

9. A method in accordance with claim 1 wherein the mixture comprises by weight:
37.04% to 37.5% acrylonitrile rubber
0.84% to 1.01% zinc oxide
1.67% to 2.02% stearic acid
0.21% to 0.51% retarder SAX salicylic acid (O-hydroxybenzoic acid) $C_6H_4(OH)$ (COOH) 14.14% to 15.83% mistron vapor $Mg_3Si_4O_{10}$ $(OH)_2$
0.83% to 1.35% coumarone Indene resin absorbed no synthetic calcium silicate (72% cumar P-25) and
10.10% to 10.83% sulfur
22.22% to 22.50% phenolic resin $(C_6H_6O\cdot CH_{20})X$
3.33% to 4.03% carbon black
0.63% to 0.84% Altax $C_{14}H_8N_2S_4$
2.50% to 2.70% epoxy-resin and
3.33% to 4.04% blowing agent $(NO)_2C_5H_{10}N_4$
the mixture of the third step is subjected to a pressure of about 350 to 410 lbs. per cubic inch for between about 10 to 18 minutes at a temperature of between about 265° F. to 275° F.

heating the mixture of the third step to between about 250° and 500° F. for between about 30 to 70 minutes.

10. A method in accordance with claim 9 wherein the mixture of the first step has a Shore A hardness of between about 65 to 75.

11. A method in accordance with claim 9 wherein the mixture of the second step has a Shore A hardness of between about 65 to 75.

12. A method in accordance with claim 9 wherein the mixture of the third step has a Shore A hardness of between about 65 to 75.

13. A method in accordance with claim 9 wherein a magnet is added during step three.

14. A method in accordance with claim 9 wherein a guide is added during step three.

15. A method in accordance with claim 9 wherein an insert is added during step three.

16. A float for sensing liquid level produced by the process comprises:
   a) mixing a rubber material and resin in a mill;
   b) adding a blowing agent to the mixture of step a);
   c) subjecting the mixture of step b) to pressure an heat to form float body material;
   d) filling a preformed plastic container with the float body material of step c);
   e) heating the filled container of step d) until the float body material expands into intimate contact with the preformed plastic container.

17. A product in accordance with claim 16 wherein the temperature of step A is below about 250° F.

18. A product in accordance with claim 16 wherein the temperature of step B is below about 250° F.

19. A product in accordance with claim 17 wherein resin is added at step B.

20. A product in accordance with claim 16 wherein the temperature of step C is below about 200° F. to 350° F.

21. A product in accordance with claim 16 wherein the temperature of step C wherein the pressure is between about 20 and 900 lbs. per cubic inch.

22. A product in accordance with claim 16 wherein a magnet is added at step C.

23. A product in accordance with claim 16 wherein an insert is added at step C.

24. A product in accordance with claim 16 wherein a guiding device is added at step C.

25. A product in accordance with claim 16 wherein the plastic container is polyethylene.

26. A product in accordance with claim 16 wherein the plastic container is polypropylene.

27. A product in accordance with claim 22 wherein the temperature of step D is between about 250° F. and 550° F.

28. A float for liquid level sensing having a chemically resistant protective plastic covering made by the process of:
   a first step, by weight mixing
      30.0% to 55.0% acrylonitrile rubber
      0.5% to 4.2% zinc oxide
      1.0% to 15.0% stearic acid
      0.1% to 2.0% retarder SAX salicylic acid (O-hroxybenzoic acid) $C_6H_4(OH)(COOH)$
      3.0% to 22% mistron vapor $Mg_3Si_4O_{10}(OH)_2$
      0.3% to 2.75% coumarone Indene resin absorbed on synthetic calcium
      Silicate (72% cumar P-25) and
      8.0% to 15.0% sulfur
   for between about 60 to 180 minutes while maintaining the temperature of the mixture to below about 250° F.,
   said blended mixture to have a shore A hardness of between about 15 to 90
   a second step comprising taking the mixture of the first step and adding by weight about
      12.0% to 40.0% phenolic resin $(C_6H_6O \cdot CH_{20})X$
      2.5% to 10.0% carbon black
      0.25% to 1.5% Altax $C_{14}H_8N_2S_4$
      1.75% to 15% epoxy-resin and
      1.0% to 5.0% blowing agent $(NO)_2C_5H_{10}N_4$
   mixing said components for about 15 to 50 minutes while maintaining the temperature of the mixture to below about 200° F.;
   said blended mixture having a shore A hardness of between about 15 and 90;
   a third step comprising transferring the mixture of the second step to a compression tool where the mixture is subjected to a pressure of about 20–900 lbs. per cubic inch for between about 5 to 45 minutes at a temperature of between about 200° F. to 350° F., removing the mixture from th compression tool and cooling
   said mixture to have a Shore A hardness of between 15 to 90;
   a fourth step, adding to said mixture any magnets, inserts or quides;
   a fifth step, placing a sufficient amount of the mixture of step 3 to fill a plastic container of the desired shape and size;
   placing the plastic container into the desired finish mold tool and heating to between about 250° F. and 550° F. for between about 20 to 180 minutes to allow the mixture to expand into intimate contact with the interior surface of the plastic container, cool and inspect for defects.

* * * * *